United States Patent [19]
Hehl

[11] Patent Number: 5,968,563
[45] Date of Patent: Oct. 19, 1999

[54] INJECTION-MOULDING UNIT FOR A MACHINE FOR THE INJECTION MOULDING OF PLASTICS

[76] Inventor: Karl Hehl, Arthur-Hehl-Str. 32, Lossburg, Germany, D-72290

[21] Appl. No.: 09/029,406

[22] PCT Filed: Aug. 13, 1996

[86] PCT No.: PCT/DE96/01532

§ 371 Date: Feb. 25, 1998

§ 102(e) Date: Feb. 25, 1998

[87] PCT Pub. No.: WO97/07971

PCT Pub. Date: Mar. 6, 1997

[30] Foreign Application Priority Data

Aug. 25, 1995 [DE] Germany .......................... 195 31 329
Nov. 14, 1995 [DE] Germany .......................... 195 42 453

[51] Int. Cl.⁶ .................................................. B29C 45/46
[52] U.S. Cl. ........................................................... 425/574
[58] Field of Search ...................................... 425/145, 574

[56] References Cited

U.S. PATENT DOCUMENTS

| | | |
|---|---|---|
| 2,966,070 | 12/1960 | Wise . |
| 4,802,558 | 2/1989 | Garnett . |
| 5,035,120 | 7/1991 | Quilliou . |

FOREIGN PATENT DOCUMENTS

| | | |
|---|---|---|
| 0 247 208 | 12/1987 | European Pat. Off. . |
| 0 316 561 | 5/1989 | European Pat. Off. . |
| 0 427 866 | 5/1991 | European Pat. Off. . |
| 0 576 925 | 1/1994 | European Pat. Off. . |
| 0 581 401 | 2/1994 | European Pat. Off. . |
| 0 627 289 | 12/1994 | European Pat. Off. . |
| 290685 | 8/1953 | France . |
| 1 043 743 | 4/1959 | Germany . |
| 1216642 | 6/1963 | Germany . |
| 50 843 | 7/1988 | Germany . |
| 41 15 758 A1 | 11/1992 | Germany . |
| 44 07 537 A1 | 9/1994 | Germany . |
| 43 24 838 A1 | 1/1995 | Germany . |
| 43 34 134 | 4/1995 | Germany . |
| 44 11 651 C1 | 4/1995 | Germany . |
| 43 44 335 | 6/1995 | Germany . |
| 4193515 | 7/1992 | Japan . |
| 577 376 | 7/1976 | Switzerland . |

*Primary Examiner*—Tim Heitbrink
*Attorney, Agent, or Firm*—Venable; Robert Kinberg

[57] ABSTRACT

An injection molding unit for a plastics injection molding machine for processing plastifiable materials includes a plasticizing unit for supplying plastifiable material to a mold via a nozzle along an injection axis. The plasticizing unit receives a feeding mechanism and the plasticizing unit is detachably received in a carrier block. The feeding mechanism is mounted at an injection bridge which is movable toward and away from the carrier block for movement of the feeding mechanism relative to the plasticizing unit. A plurality of electromechanical drive units are arranged symmetrically to the injection axis for displacement of the injection molding unit along the injection axis for attachment of the nozzle to the mold. A plurality of electromechanical injection units are arranged symmetrically to the injection axis for movement of the injection bridge relative to the carrier block. The carrier block and injection bridge are displaceable along linear guiding elements. The linear guiding elements are arranged symmetrically to the injection axis and the drive units, the injection units and the linear guiding elements lie in different planes each of which include the injection axis.

12 Claims, 6 Drawing Sheets

INJECTION-MOULDING UNIT FOR A MACHINE FOR THE INJECTION MOULDING OF PLASTICS

CROSS REFERENCE TO RELATED APPLICATIONS

The present application claims the priorities of the German Patent Applications 195 31 329, filed on Aug. 25, 1995 as well as 195 42 453, filed on Nov. 14, 1995, the disclosures of which are herewith also explicitly the subject matter of the present application.

TECHNICAL FIELD

The invention concerns an injection molding unit for a plastics injection molding machine for processing plastifiable materials such as synthetic materials, powdery and ceramic masses.

The invention relates to an injection molding unit for a plastics injection molding machine for processing plastifiable materials, the machine being of the type including: a plasticizing unit for supplying plastifiable material to a mold via a nozzle along an injection axis; feeding means received in the plasticizing unit; a carrier block detachably receiving the plasticizing unit; an injection bridge at which the feeding means is mounted and which is movable towards and away from the carrier block for movement of the feeding means relative to the plasticizing unit; a plurality of electromechanical drive units arranged symmetrically to the injection axis for displacement of the injection molding unit along the injection axis for attachment of the nozzle to the mold; a plurality of electromechanical injection units arranged symmetrically to the injection axis for movement of the injection bridge relative to the carrier block; and linear guiding elements along which the carrier block and the injection bridge are displaceable.

PRIOR ART

Such an injection molding unit wherein a carrier block is seated so as to be axially displaceable relative to a stationary mold carrier, is known from EP-A 576 925. The linkage between carrier block and stationary mold carrier takes place via electromechanical spindle drives nested in series, wherein these comprise a drive unit, formed as a hollow shaft motor for attachment of the nozzle to the injection mold and an injection unit, which generates the axial movement of the feed screw within the plasticizing cylinder during injection. Furthermore a rotational motor for the rotation of the feed screw is provided at an injection bridge. Guide rails on which at least the carrier block is guided, are provided at the machine base as guidance which is not effected symmetrically. Further guiding elements are not provided. The serial arrangement of the drive unit and the injection unit results in a large overall length of the injection molding unit, since the movement paths of both units are lined-up one behind the other. In case of a defect of one unit, at least one 'spar' with both units has to be dismounted, causing unnecessary extra work and additional costs. The arrangement of the units in the area of the plasticizing cylinder makes the access to the plasticizing cylinder itself more difficult.

From DE-C 43 17 998 it is also known to arrange drive units for attaching the nozzle and an injection unit symmetrically to the injection axis. Electromotors serve as drives, which drive the hollow shafts of the drive unit and the injection unit, which are nested into one another, via belt drives. Also here both units can only be exchanged together and no separate guiding elements, except of the guiding strips placed loosely at the machine base, are provided.

In the area of the hydraulically driven injection molding units it is known from DE-C 37 35 419, to arrange two drive units for attachment of the nozzle to the mold and two injection units symmetrically to the injection axis on two different planes. The piston rod of the drive unit at the same time takes over a guiding function for the whole injection molding unit, so that merely due to the sealing of the hydraulic liquids in the pistons, a guiding precision is granted, which with electromechanical drives cannot be achieved in the same way. It is not sufficient; however, just to exchange the hydraulic drives with electromechanical drives in order to transfer this principle to an electromeachanically driven injection molding unit. This would then result in such a clearance in the area of the drive unit, that a reproduceable precision cycle by cycle and an attachment precision of the nozzle cannot be achieved.

SUMMARY OF THE INVENTION

Based on this state of the art, it is an object of the invention to modify an injection molding unit of the type cited at the outset in such a way that an improved guidance of the injection molding unit is obtained in a favorable manner. The above and other objects are accomplished in the context of an injection molding unit for a plastics injection molding machine of the type first mentioned above, wherein the linear guiding elements are arranged symmetrically to the injection axis, and the drive units, the injection units and the linear guiding elements lie in different planes each of which include the injection axis.

First of all, the linear guiding elements are also arranged symmetrically to the injection axis, so that an axis-symmetrical guidance of the parts movable against one another of the injection molding unit is obtained. At the same time the rods stabilize the whole injection molding unit, so that it can be displaced or swivelled as a structural unit for example for injection into the parting plane. Besides, the arrangement of different planes creates the structural conditions for the application of standard motors, wherein the maximum movement paths of the individual units can be nested with each other in a space-saving manner. In order to realize a favorable, reliable guidance for the electromechanical embodiment, separate guiding components are provided, which are arranged, however, symmetrically to the injection axis in order to achieve a corresponding precision. The solution of guiding function, nozzle drive function and injection function into three different subassemblies, which all together are symmetrical to the injection axis, results in an improved guidance as well as easier access to the individual subassemblies, each one of them being a structural unit.

DETAILED DESCRIPTION OF THE PREFERRED EMBODIMENTS

The invention will now be described in more detail by example with reference to the accompanying Figures. The illustrated embodiments are merely examples, which should not limit the inventive concept to any particular physical configuration.

The injection molding unit serves for dosing and injecting plastifiable materials as for example plastic materials, powdery masses and ceramic masses into a mold cavity 80 (FIG. 2) of a mold M. At least a part of the mold M is in close contact with a stationary mold carrier 35, wherein a nozzle D comes to rest on this mold M in the injection axis s—s during the injection.

Figure 1:
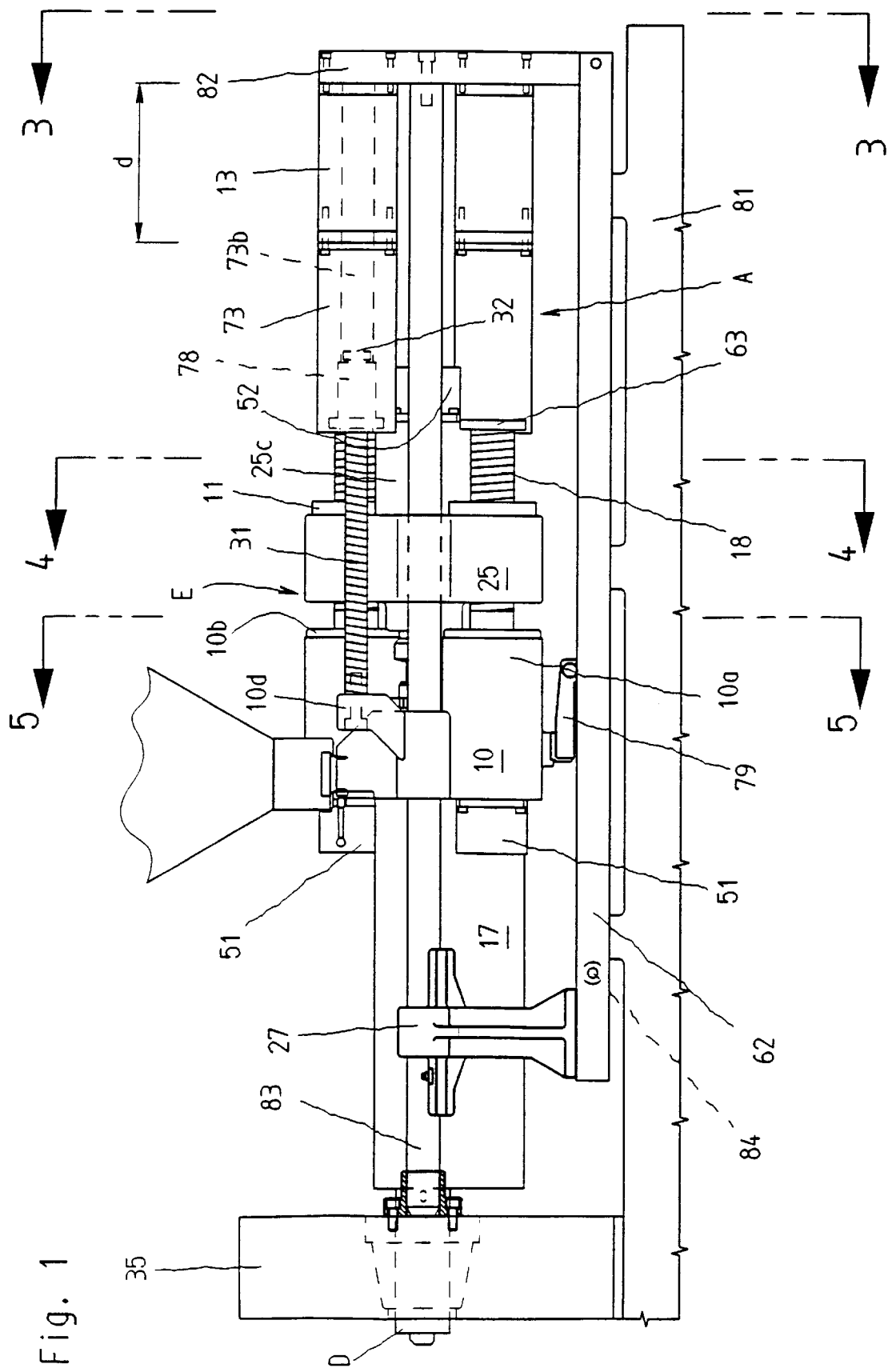
FIG. 1 A side view of an injection molding unit arranged at the stationary mold carrier, FIG. 2 a top view on the injection molding unit according to FIG. 1, FIG. 3 a section according to line 3—3 of FIG. 1, FIG. 4 a section according to line 4—4 of FIG. 1, FIG. 5 a section according to line 5—5 of FIG. 1, FIG. 6 a section according to line 6—6 of FIG. 3.
Figure 2:
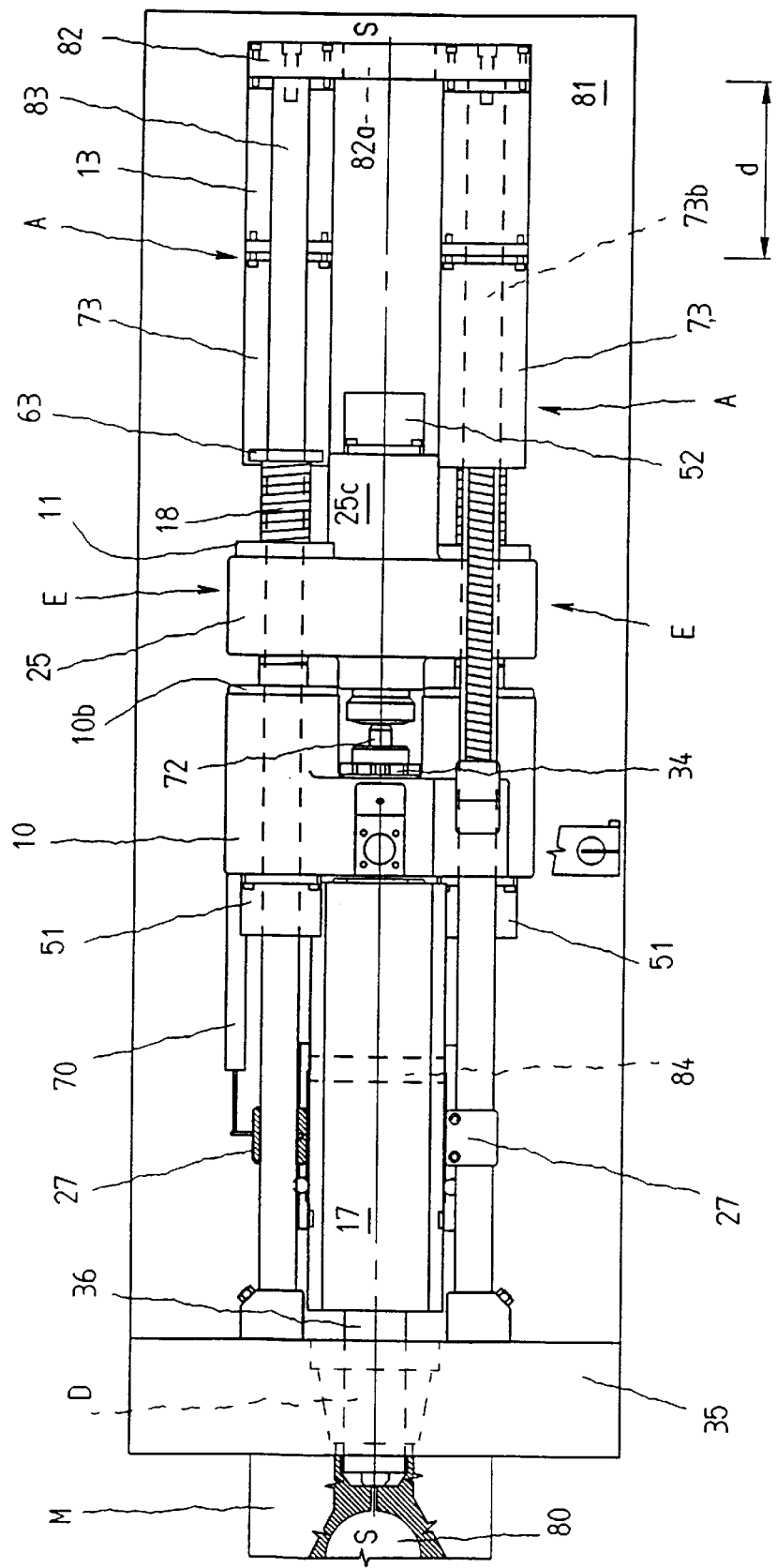

According to FIGS. 1 and 2, the injection molding unit comprises a plasticizing unit 17 provided with a plasticizing cylinder 36, in which a feeding means 72 is arranged. The feeding means 72 in the illustrated embodiment is a feed screw, however, it also can be a feed piston. The plasticizing unit 17 itself is received detachably at the carrier block 10. For this purpose it penetrates the carrier block and is fixable at the back of the carrier by a nut 34. A further component of the injection molding unit is an injection bridge 25, at which the feeding means 72 is mounted. A movement of the injection bridge 25 in direction towards and away from the carrier block 10 results in a relative movement of the feeding means 72 relative to the plasticizing unit 17, by which the plastifiable material is injected into the mold cavity 80.

The movement is effected by a plurality of electromechanical movement units. For displacement of the injection unit along the injection axis s—s and for attachment of the nozzle D to the mold M, a plurality of electromechanical drive units A, arranged symmetrically to the injection axis s—s, are provided. To move the injection bridge 25 relative to the carrier block 10 a plurality of electromechanical injection units E, arranged symmetrically to the injection axis s—s, are provided.

At the same time, the injection bridge and the carrier block are movable along linear guiding elements 83. The linear guiding elements 83 are spars on which the carrier block 10 is guided by slide bearings 33*a* and the injection bridge 25 by slide bearings 33*b*. Strips 62, at which at least the carrier block 10 is guided by guiding elements 79, are provided as further guidings.

Figure 3:
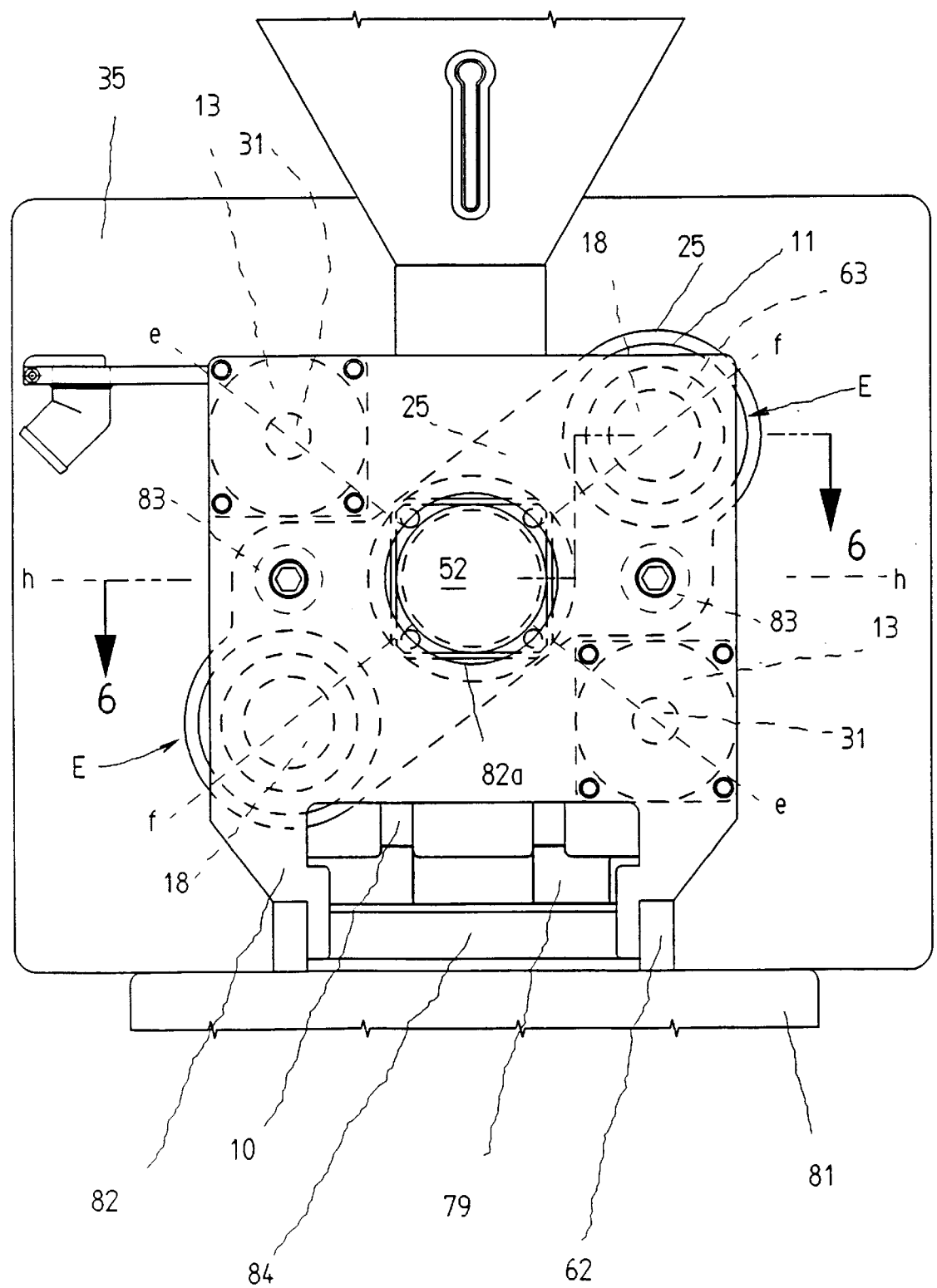
Figure 4:
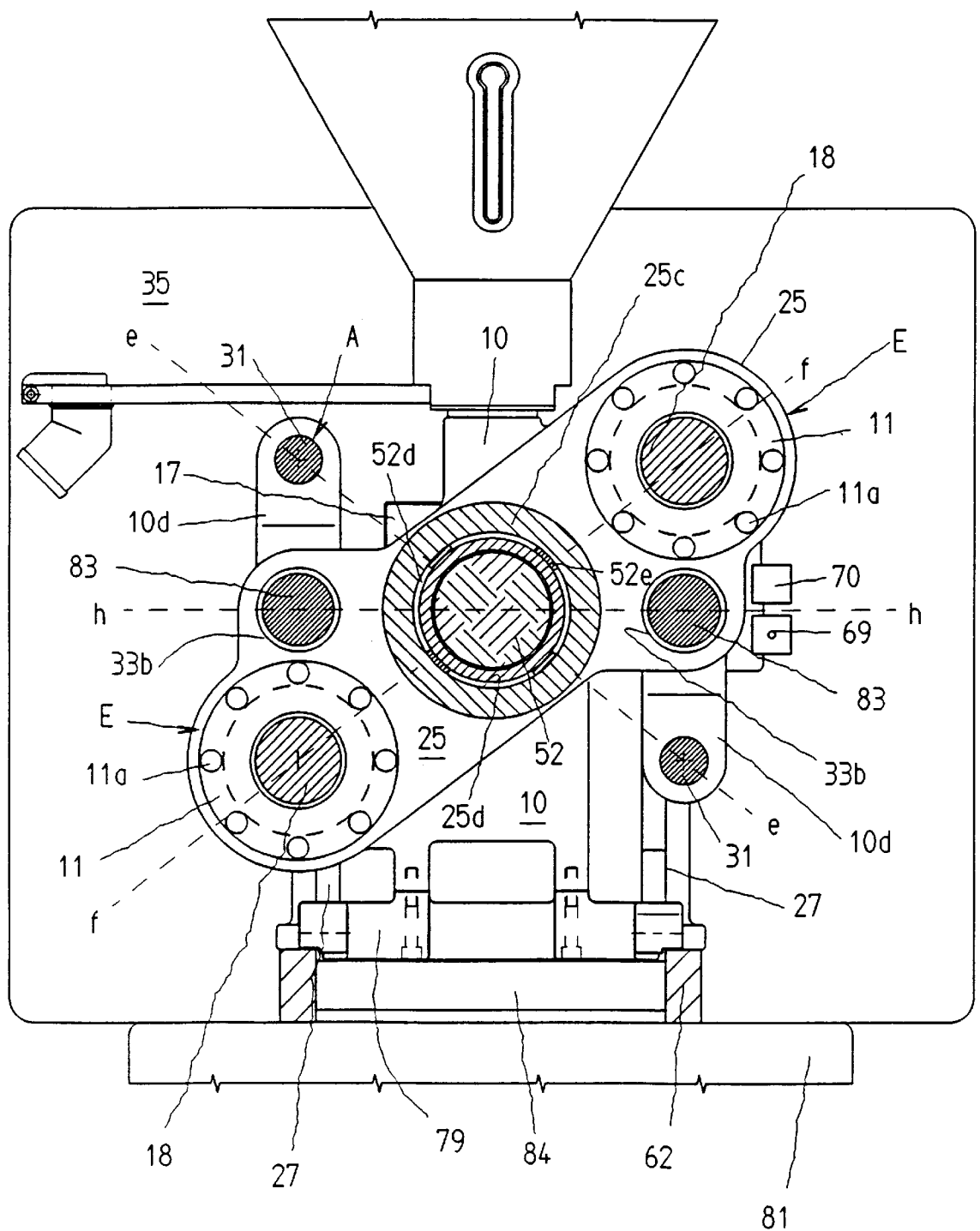
Figure 5:
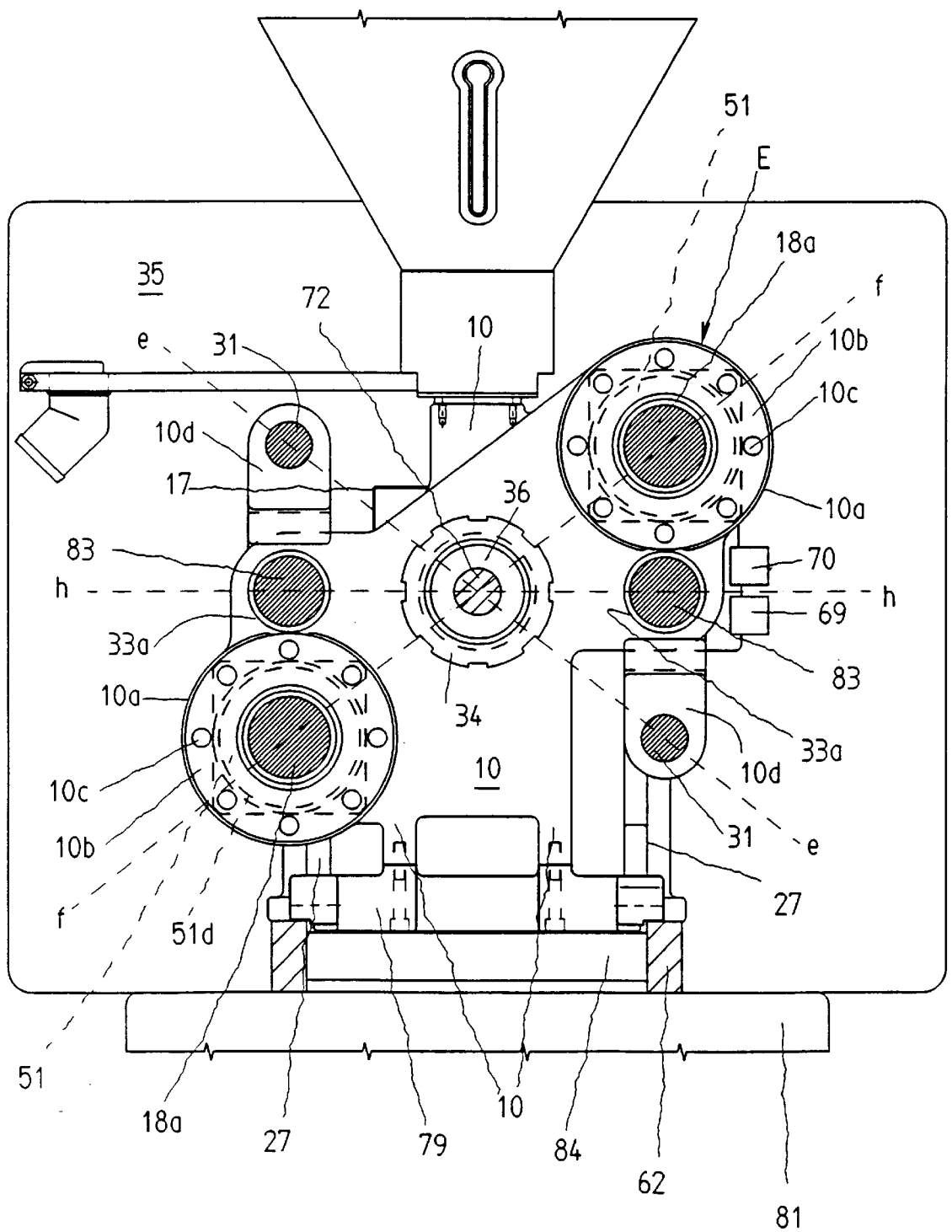
Figure 6:
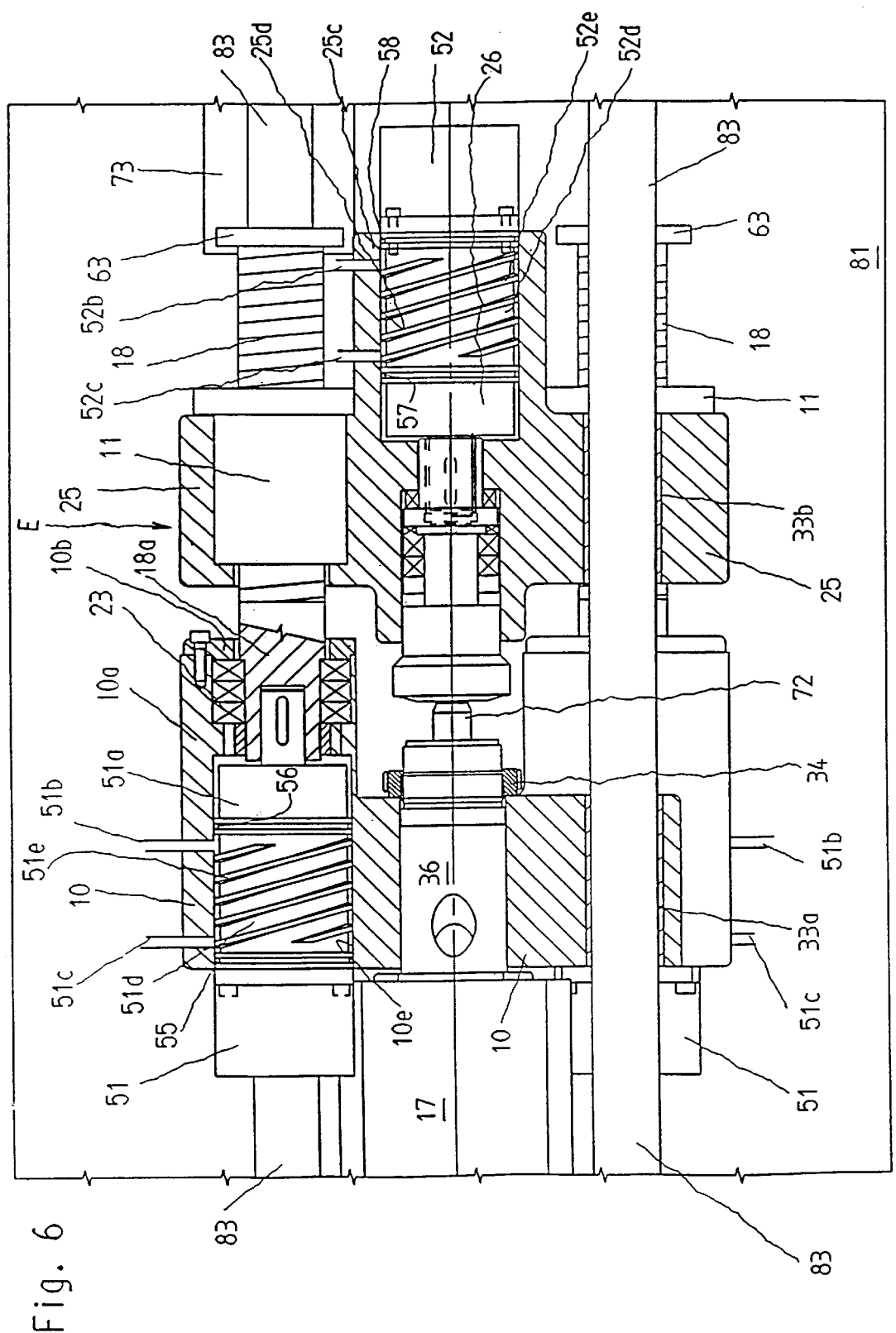

The linear guiding elements 83, according to the FIGS. 3 to 5, are arranged symmetrically to the injection axis s—s and penetrate the carrier block 10 and the injection bridge 25. At the same time the drive units A, the injection units E and the linear guiding elements 83 are positioned in different planes, which altogether include the injection axis s—s. While the linear guiding elements 83 are in a horizontal plane h—h, the drive units A and the injection units E are located in a first plane e—e and a second plane f—f, respectively, inclined towards the horizontal plane. This solution for combining known units makes possible the use of standard motors, allows the shortening of the total length of the injection unit, since the different movement paths can be nested one with the other, and nevertheless grants an extremely precise guidance and stability of the injection molding unit.

Basically it is possible to assign one motor to the drive units and injection units and to drive these for example via belt drives or gearings. In the illustrated embodiment, however, each drive unit A and each injection unit E has its own drive motor 73 and injection motor 51, respectively, so that each unit itself together with its motor constitutes a structural unit, which is fixable at the carrier block. This way each structural unit can be tested by the manufacturer, independently from the remaining injection unit and can be simply supplied to the injection unit after a previous function testing.

In the illustrated embodiment, the injection unit E is an electromechanical spindle drive with a spindle 18 which is driven by the drive motor 51, wherein the drive motor is mounted in the carrier block 10.

The force of the drive motor can be transferred geared-down to an area 18*a* with a reduced diameter via a gear 51*a* formed as a planetary gear, which area is beared at a forming 10*a* of the carrier block by bearings 23. As an associated component a nut 11 secured against turning is fixed at the injection bridge 25 via a fixing means 11*a* (FIG. 4). A reversing of the arrangement of spindles and nuts or an arrangement of the injection motor 51 at the injection bridge is possible, however, this would have the disadvantage, that larger masses would have to be moved. Also the function of spindle and nut can be exchanged by designing for example the 'spindle' as a long tube-like element with interior profile, into which—in case necessary by interconnection of rollers and roll barrels—a short spindle with exterior profile plunges as the 'nut'. By this construction an additional protection of the drive against exterior influences is obtained.

The linear guiding elements 83 on the one hand are detachably fixed in known manner at the stationary mold carrier 35. There they can also be held in a displaceable carrier, so that the injection unit is displaceable laterally or upwardly for a linear gate molding. Besides, the linear guiding elements 83 extend over the whole length of the injection molding unit, wherein they determine the static maximum overall length of the injection molding unit. According to FIG. 1 a supporting plate 82 serving as an abutment for the drive units A is located at the end of the linear guiding elements 83, which is facing away from the stationary mold carrier 35. The forces arising during the movement of the carrier block 10 for attachment of the nozzle and when the nozzle is attached, are thus led to the supporting plate 82 via the linear guiding elements 83 formed as spars and to the carrier block 10 via the drive units A. At the same time the drive motor 73 is displaced so far backwards that the plasticizing cylinder is freely accessible. Thus, in the access area of the operator there are no drives. However, the whole overall length of the injection molding unit is not increased, since as in the constructions known in the prior art, a corresponding space for the movement of the injection molding unit must be reserved, which now only is fixed statically by the guiding elements and the supporting plate.

In the illustrated embodiment the drive motor 73 is a hollow shaft motor, which drives a spindle nut 78. The associated spindle 31 is mounted, secured against turning, in shoulders 10*d* of the carrier block. In order to have enough space for the spindle when the injection molding unit is moved away from the stationary mold carrier 35, a cavity 73*b* is provided in the drive motor 73. Transition pieces 13 can be provided between the supporting plate 82 and the drive motor 73. The distance d between supporting plate 82 and 73 can be modified by these transition pieces 13, which can be exploited for obtaining a modified length/diameter relation in the area of the feeding means 72, if for example longer plasticizing units 17 are used. The forces of the drive motor 73 can also be transferred via an integrated planetary gear in a form not represented graphically. It is also possible to replace the drive motors 73 assigned to both drive units A by a single motor, which then drives the two spindle drives via belt drives or gearings. In this case even the drive motor 73 could be structurally identical with the rotational motor 52 or the injection motor 51.

In the front area the linear guiding elements 83 are supported on strips 62 by supporting elements 27. The supporting elements are in rigid connection with the linear guiding elements as well as with the strips 62. The strips 62 are reinforced in height of the supporting elements via a cross strut 84, wherein according to FIG. 3 in the rear area a frame is created in connection with the supporting plate 82. However, since the linear guiding elements 83 are also fixed at the supporting plate 82, a three-dimensional reinforcement-frame is obtained, which is of special advantage when the injection molding unit is to be moved together with the support. Such a movement is for example necessary in order to make the injection molding unit accessible to an injection in the parting plane for example by swivelling or in order to realize the maintenance of the injection molding unit in a depot.

For setting into rotation the feed screw 72 a rotational motor 52 is provided, which transmits its force geared-down to the feed screw 72 via a gearing 26 preferably formed as planetary gearing. The rotational motor 52 is received in a seat 25d of a forming 25c of the injection bridge 25. Since the forces necessary for the injection movement with help of the injection motor 51, coarsely approximated, are about double the forces necessary for the rotation of the feed screw by the rotational motor 52, it is possible to design the rotational motor in its structural form identically with one of the two injection motors 51. Besides, it is also possible to design the associated gearings 51a, 26 preferably as structurally identical planetary drives, so that basically one standard motor type can be used for the different units.

The solution of the units combined one with each other here also has the advantage, that a corresponding space is available to design the rotational motor 52 and the injection motor 51 as built-in motors. For this purpose the injection motor 51 has ribs 51e at its exterior wall, the exterior diameter of which approximately corresponds to the interior diameter of the seat 10e of the carrier block 10. This way a cooling channel 51d is created between carrier block 10 and injection motor 51, which can be passed by any desirable cooling medium. The cooling channel 51d is supplied via the connections 51b,51c. The spiral-like arrangement of the ribs 51e creates a spiral-like cooling channel. The whole cooling channel is sealed towards the outside by sealing rings 55,56, so that the cooling channel is created by merely inserting the injection motor 51 into the seat 10e. For fixing the injection motor it is then only necessary to add the bearings 23 from the other side and the injection motor then is fixed at the injection bridge by the cover 10b, which in its turn is fixed by the fixing means 10c. The limit stop 63 serves as path limitation for the movement of the injection bridge 25.

Likewise, the rotational motor 52 can be designed as a structurally identical built-in motor. The rotational motor 52 therefore has ribs 52e, the exterior diameter of which approximately corresponds to the interior diameter of the seat 25d of the injection bridge. The cooling medium is here supplied to the cooling channel 52d via the connections 52b,52c. Also here, simply by introducing the rotational motor 52 into the seat 25d, the spiral-like cooling channel 52d is created in connection with the seating rings 57,58.

It is self understood, that this description can be subject to different modifications, changes and adjustments ranging within the area of equivalents to the annexed claims.

I claim:

1. An injection molding unit for a plastics injection molding machine for processing plastifiable material, comprising:
    a plasticizing unit for supplying said plastifiable material to a mold via a nozzle (D) along an injection axis,
    a feeding means received in the plasticizng unit,
    a carrier block detachably receiving the plasticizing unit,
    an injection bridge at which the feeding means is mounted and which is movable towards and away from the carrier block for movement of the feeding means relative to the plasticizing unit,
    a plurality of electromechanical drives units, arranged symmetrically to the injection axis for displacement of the injection molding unit along the injection axis for attachment of the nozzle to the mold,
    a plurality of electromechanical injection units, arranged symmetrically to the injection axis for movement of the injection bridge relative to the carrier block,
    linear guiding elements, along which the carrier block and the injection bridge (25) are displaceable,
    wherein the linear guiding elements are arranged symmetrically to the injection axis and the drive unit, the injection units and the linear guiding elements lie in different planes each of which include the injection axis.

2. Injection molding unit according to claim 1, wherein the linear guiding elements comprise spars and the carrier block and the injection bridge each include slide bearings via which the carrier block and injection bridge are guided on the spars.

3. Injection molding unit according to claim 1, wherein the linear guiding elements are positioned in a horizontal plane, the drive units are positioned in a first plane inclined towards the horizontal plane and the injection moulding units are positioned in a second plane inclined towards the horizontal plane.

4. Injection molding unit according to claim 1, wherein each drive unit comprises its own drive motor and each injection unit comprises its own injection motor, and each drive unit and each injection unit is fixable as a structural unit at least at the carrier block.

5. Injection molding unit according to claim 1, further including a stationary mold carrier and wherein the linear guiding elements are detachably fixed at the stationary mold carrier and extend over a whole length of the injection molding unit and determine essentially a maximum overall length of the injection molding unit when the injection bridge is in its most retracted postion.

6. Injection molding unit according to claim 1, further including a supporting plate arranged at an end of the linear guiding elements and constituting an abutment for the drive unit for displacement of the injection molding unit, which drive unit includes a hollow shaft drive motor.

7. Injection molding unit according to claim 6, further including exchangeable transition pieces for varying a distance between the supporting plate and the hollow shaft drive motor.

8. Injection molding unit according to claim 1, further including strips and a supporting element mounted on the strips in a frontal area of the injection molding unit for supporting the linear guiding elements, the carrier block further including guiding elements arranged for being guided by the strips.

9. Injection molding unit according to claim 1, further including a supporting plate fixed at the strips and wherein the linear guiding elements have rear ends facing away from the stationary mold carrier which are fixed at the supporting plate.

10. Injection molding unit according to claim 4, wherein the feed means comprises a feed screw and the injection a bridge includes a rotational motor for rotation of the feed screw, which rotational motor has a structural form including a gearing which is identical with one of the injection motors of the injection units.

11. Injection molding unit according to claim 4, wherein between an exterior wall of the injection motor and a seat in the carrier block, there are disposed cooling channels for cooling the injection motor through a cooling medium.

12. Injection molding unit according to claim 1, wherein the feeding means comprises a feed screw and the injection bridge includes a rotational motor for rotation of the feed screw, and between an exterior wall of the rotational motor and a seat of the injection bridge there are disposed cooling channels for cooling the rotational motor through a cooling medium.

* * * * *